June 19, 1945.  W. M. JEFFERS  2,378,556

SYNCHRONOUS MOTOR

Filed May 11, 1942

INVENTOR.
WALTER M. JEFFERS
BY Bodell + Thompson
Attys.

Patented June 19, 1945

2,378,556

UNITED STATES PATENT OFFICE 2,378,556

SYNCHRONOUS MOTOR

Walter M. Jeffers, Syracuse, N. Y., assignor to Crouse-Hinds Company, Syracuse, N. Y., a corporation of New York Application May 11, 1942, Serial No. 442,408

2 Claims. (Cl. 172—278)

This invention relates to electric motors and more particularly to self-starting synchronous motors operated on a single phase alternating current. Motors of this type are employed to a great extent for operating timing devices. These motors employ a field or stator member formed with one or more pairs of poles and having some means to provide a rotating or shifting magnetic field. It is conventional to effect this rotating field by providing the pole pieces of the stator with shading coils. These motors further include a rotor so formed or provided with means effective to start the motor and some means to keep the rotor in step or synchronism at a definite predetermined speed.

To make the motor self-starting and to cause it to run as a synchronous motor, the rotor is formed or provided with an induction element which, if the rotor is of cylindrical form, usually is of the squirrel cage construction, or the rotor may be of the disk form, the disk being made of non-magnetic, electrically conducting material, whereby the shaded pole pieces create eddy currents in the disk to effect its rotation as an induction motor in the manner well understood. The rotor is also provided with a reaction element which may take the form of salient poles produced, as by slotting the rotor of cylindrical form, or by inserting pellets of magnetic material in the rotor of the disk form.

The arrangement and construction of the motor, including the pole pieces, the induction element and the reaction element, is such that the motor is self-starting by the induction torque produced by the induction element, and the motor runs as a synchronous motor because of the reaction torque developed by the reaction element of the rotor. However, to effect these results the relative relation and spacing of the parts of the motor must be very accurate and this relation and spacing of the various parts sometimes presents a problem which can only be solved by making some sacrifices in the starting torque, or the synchronous torque, or in the consumption of current. This is particularly so in the disk type of motor where the eddy currents effecting the induction torque can not be physically controlled or maintained in limited locations.

This invention involves a motor of the type referred to which embodies a novel construction whereby both the starting torque and the running torque are materially increased for the same current consumption.

The invention consists in the novel features and in the combinations and constructions hereinafter set forth and claimed.

In describing this invention, reference is had to the accompanying drawing in which like characters designate corresponding parts in all the views.

Figure 1:
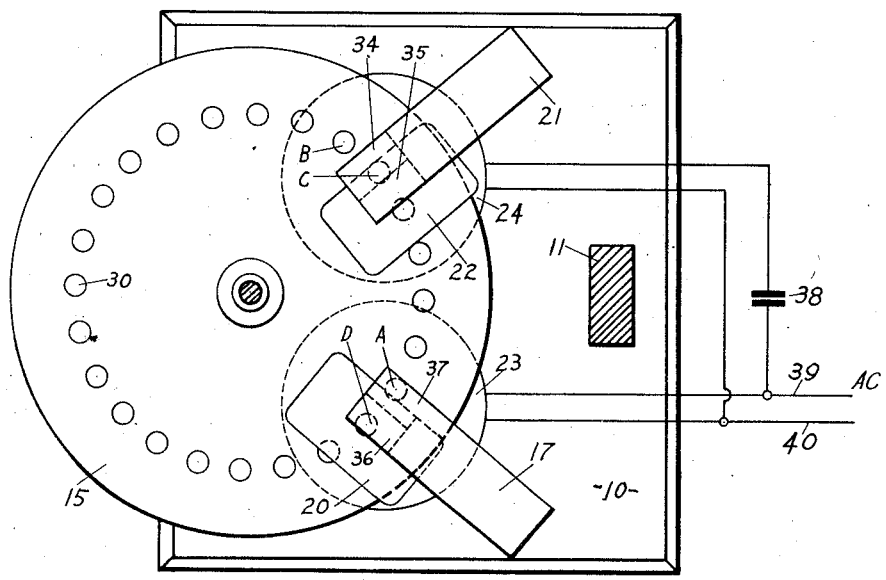
Figure 1 is a top plan view, with parts omitted, of a motor embodying my invention.
Figure 2:
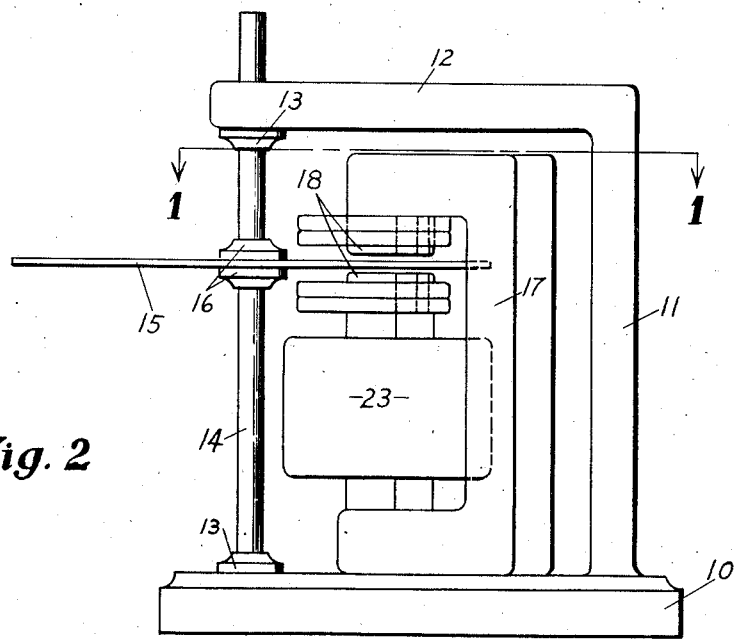
Figure 2 is a side elevational view of the motor.

The embodiment of my invention is herein disclosed in connection with a disk type of motor. The motor consists of a base 10 provided with an upright 11 and a laterally extending arm 12.

Bearings 13 are formed in the base and in the arm 12 to receive the rotor shaft 14 on which the disk 15 is secured in any suitable manner as by collars 16.

The stator element of the motor consists of a U shaped field member 17 having pole pieces 18, each slotted to receive a shading element 20. The stator also consists of a second field member 21 of identical construction including shading members 22. The field members are provided with field coils 23, 24, respectively. The pole pieces 18 of each field member are so positioned and spaced as to permit the marginal portion of the disk 15 to rotate therebetween, and the disk 15 is provided with a plurality of magnetic sections 30, here shown in the nature of pins or pellets. It will be understood that the disk 15 is formed of non-magnetic material, such as copper or aluminum, and that the pellets 30 are formed or iron.

This construction and arrangement described is conventional, and the operation of the motor as such is well understood. In brief, when the coils 23, 24 are energized the magnetic flux of the pole pieces 18 cuts the disk, setting up localized eddy currents therein which, in turn, react against the flux and, because the field is shifting as a result of the shading members 20, 22, the disk is caused to rotate. As the pellets 30 pass between the pairs of pole pieces 18, there is a tendency for the pellets to lock in, or remain in position to intercept the maximum number of lines of force. This effect, when the motor is starting, is of course in opposition to the rotation of the disk on the eddy current principle and therefore, if the pellets 30 are not accurately dimensioned in size and spacing in respect to the pole faces, or the pole pieces are positioned too close to the disk, the disk will lock and the motor will not start.

Particularly in regard to the manufacture of the disk type of motor, the dimensions and arrangement of the magnetic sections can not be maintained with accuracy, and in order to make the motor function properly the pole pieces 18 are separated a distance materially greater than necessary to allow for the free rotation of the disk 15. This separation, of course, requires considerable more current input in order to obtain the same output from the motor or, in other words, materially decreases the efficiency of the motor. Accordingly, the designer is confronted with the problem of sacrificing either starting torque or running torque for a given power input. Usually the torque requirements of a given motor are limited to a minimum and in order to keep above this minimum in torque requirement and still have the motor self starting and run in true synchronous speed, it is necessary to sacrifice on efficiency.

In accordance with my invention, the pole pieces 18 are adjusted so that they are positioned as close to the sides of the disk 15 as it is possible for them to be and still permit the disk to rotate freely. This increases the efficiency of the motor and the invention further contemplates a construction by which such preferred positioning of the pole pieces does not interfere with the synchronous operation of the motor.

To bring about this result, I position one pair of pole pieces relative to the other pair so that when one of the pellets, such as A, is positioned centrally in the flux of the unshaded portion of one pair of pole pieces, such as those of pole member 17, a pellet is not so positioned in respect to the faces of the pole element 21, but rather such other pellet, as B, is approaching the pole pieces of the member 21. In other words, the pole pieces of each pair are so spaced relative to the pole pieces of the other pair that the magnetic sections of the rotor are not, at any instant, uniformly positioned with respect to the pole pieces of both pairs.

With this arrangement, if both of the coils 23, 24, are energized simultaneously, the pellet A tends to lock in the flux of the unshaded portion 37 of pole piece 17, and the pellet B is drawn toward the pole member 21. Thus, the locking effect of pellet A is cancelled out or neutralized by the pellet B. Accordingly, this arrangement does not interfere with the starting torque of the motor. However, when the motor approached synchronous speed it would not stay in step due to the fact that the effect of the pellets approaching one pair of pole pieces would be operating in opposition to the pellets under the influence of the other pole member.

To overcome this latter problem, I provide means in the circuit to effect a phase displacement of the flux of one pole member in respect to the flux of the other pole member. This means here shown is in the nature of a condenser 38 connected in circuit with the coil 24, the coil 23 being connected directly to the source 39, 40. The effect of the condenser 38 is that when the flux of the unshaded portion of one pair of pole pieces is at its maximum, the flux of the same portion of the other pair of pole faces is at its minimum, or is at least sufficiently displaced in phase relation so that there is no tendency of the disk to lock.

It will be noted, referring to Figure 1, that the spacing of the pellets 30 in the motor illustrated is less than the width of the faces of pole pieces including the shaded and unshaded portions. For example, while the pellet B is approaching the pole faces of element 21, the next preceding pellet, indicated at C, is positioned beneath the shading coil 22, or between the unshaded portion 34 and the shaded portion 35 of the pole face where the flux has little or no effect on the pellet. Likewise, in regard to the pole element 17, the pellet next preceding A, indicated at D, is positioned under the shaded portion 36 of the pole face while the pellet A is positioned under the unshaded pole portion 37. It is well understood that the shading coils 20, 22, simply retard the flux in the shaded portion of the pole piece and thereby effect a shifting flux or field or, in other words, the action of the flux in the unshaded portion of the pole piece is repeated an instant later at the shaded portion and accordingly the explanation of the operation of the motor in regard to the unshaded portions of the pole pieces suffices as to the shaded portions thereof.

While I have illustrated the invention as embodied in a motor having two pair of pole pieces, it would be apparent that the motor may embody more than two pairs of poles. For example, if it were found necessary to increase the torque of the motor, another pair of pole pieces could be added to each pair shown, and each of said added pairs could be positioned complemental with the pair to which it was associated. That is, there could be two pole members 17 and two pole members 21. The coil of the additional pole member 21 would be energized from the circuit including the condenser 38. Or, the additional pole members could be arranged independently of the members 17, 18, and the flux thereof displaced in accordance with the position assumed. For example, a third pair of pole pieces could be added and the three pairs so spaced relative to each other that the magnetic sections of the rotor would not be uniformly positioned with respect to all of the pairs of pole pieces to give an analogous three cylinder engine effect instead of a two cylinder effect and in this event, the coil of the third pair could include in its circuit a reactor in place of a condenser, whereby the flux would be substantially equally displaced in all three pole members.

It will be evident that I have materially improved the operation and efficiency of motors of this type particularly in that I have materially increased the synchronous torque with a given power input.

What I claim is:

1. A synchronous motor of the induction disk reaction type comprising a stator element having two pairs of pole pieces, a field coil for energizing each pair of pole pieces, a rotor mounted for rotation in juxtaposition to said stator, said rotor being formed with an induction element and having a plurality of magnetic sections arranged to pass between the pole pieces of each pair upon rotation of the rotor, each pair of pole pieces being provided with a shading coil cooperable with said induction element to effect induction torque, the pole pieces of one pair being so spaced relative to the pole pieces of the other pair that when one of said magnetic sections is positioned to intercept the maximum lines of force produced by one pair of pole pieces, another one of said magnetic sections is approaching the flux field of said other pair of pole pieces, means connected in circuit with the field coil of one pair of pole pieces to effect a phase displacement in said pair of pole pieces relative to the flux of said other pair of pole pieces.

2. A synchronous motor of the induction disk reaction type comprising a stator element having two pairs of pole pieces, a field coil for energizing each pair of pole pieces, a disk rotor mounted for rotation in juxtaposition to said stator, said rotor being formed of non-ferrous metal and being provided with a plurality of magnetic sections arranged to pass between the pole pieces of each pair of poles upon rotation of the rotor, each pair of pole pieces being provided with a shading coil cooperable with said disk to produce induction torque, the pole pieces of one pair being so spaced relative to the pole pieces of the other pair that when one of said magnetic sections is positioned to intercept the maximum lines of force produced by one pair of pole pieces, another one of said magnetic sections is approaching the flux field in said other pair of pole pieces, the field coil associated with said other pair of pole pieces being connected in circuit with means operable to effect a lagging phase displacement of the flux across said other pole pieces, and to permit said flux to reach maximum when the magnetic section of the rotor has moved into register with said other pole pieces.

WALTER M. JEFFERS.